(12) United States Patent
Ebihara et al.

(10) Patent No.: US 7,516,329 B2
(45) Date of Patent: Apr. 7, 2009

(54) INFORMATION PROCESSING APPARATUS

(75) Inventors: Munetake Ebihara, Kanagawa (JP); Mitsuru Tanabe, Kanagawa (JP); Ichiro Sato, Chiba (JP)

(73) Assignee: Sony Corporation (JP)

( * ) Notice: Subject to any disclaimer, the term of this patent is extended or adjusted under 35 U.S.C. 154(b) by 1160 days.

(21) Appl. No.: 10/276,561

(22) PCT Filed: Mar. 25, 2002

(86) PCT No.: PCT/JP02/02860

§ 371 (c)(1),
(2), (4) Date: Jul. 3, 2003

(87) PCT Pub. No.: WO02/077827

PCT Pub. Date: Oct. 3, 2002

(65) Prior Publication Data

US 2004/0015441 A1     Jan. 22, 2004

(30) Foreign Application Priority Data

Mar. 23, 2001    (JP) ................ 2001-85661

(51) Int. Cl.
*H04K 1/00* (2006.01)
(52) U.S. Cl. .............. 713/179; 705/50; 705/59; 380/232; 707/1; 707/9
(58) Field of Classification Search ............ 705/50, 705/59; 713/179; 380/232; 707/1, 9
See application file for complete search history.

(56) References Cited

U.S. PATENT DOCUMENTS

| | | | | |
|---|---|---|---|---|
| 4,532,588 A | * | 7/1985 | Foster | 709/238 |
| 4,888,731 A | * | 12/1989 | Chuang et al. | 365/49.17 |
| 5,577,055 A | * | 11/1996 | Westerlund | 714/805 |
| 5,615,126 A | * | 3/1997 | Deeley et al. | 716/1 |
| 5,644,708 A | * | 7/1997 | Larsson | 714/49 |
| 5,706,210 A | * | 1/1998 | Kumano et al. | 709/224 |

(Continued)

FOREIGN PATENT DOCUMENTS

EP    1049989 B1    5/2003

(Continued)

OTHER PUBLICATIONS

Taro Yoshio, "Kogata Memor Card de Ongaku Chosakuken o Mamoru", Nikkei Electronics, Nikkei Business Publications, Inc., 739:49-53 [1999].

(Continued)

*Primary Examiner*—Kambiz Zand
*Assistant Examiner*—Yonas Bayou
(74) *Attorney, Agent, or Firm*—Lerner, David, Littenberg, Krumholz & Mentlik, LLP

(57) ABSTRACT

An information processing apparatus that enables management of copyrighted content to which identification information is not added. An arithmetical unit computes a hash value based on data from a portion of the content data recorded in a mini-disk (MD), and transmits the value from an input/output unit to a personal computer. Based on the hash value, the personal computer identifies the content recorded in the MD, and performs management procedures based on the display information of check-in and checkout of the content. The information processing apparatus can also be applied to personal computers.

19 Claims, 14 Drawing Sheets

| CONTENT ID | ABLE TO BE CHECKED OUT | MAXIMUM NUMBER OF TIMES CHECK-OUT CAN BE PERFORMED | NUMBER OF TIMES CHECK-OUT CAN BE PERFORMED | ABLE TO BE MOVED | ABLE TO BE COPIED | NUMBER OF TIMES COPYING CAN BE PERFORMED | LIMIT OF USE | | PERMITTED AREA FOR USE | SIGNATURE | USER'S AREA | |
|---|---|---|---|---|---|---|---|---|---|---|---|---|
| | | | | | | | START DATE | TERMINATION DATE | | | CHECK-OUT TIME | |
| HASH1 | YES | 3 | 3 | YES | NO | — | — | — | JAPAN | XXYYSBYE | 2001.3.1 | --- |

U.S. PATENT DOCUMENTS

| | | | |
|---|---|---|---|
| 5,708,767 A * | 1/1998 | Yeo et al. | 345/440 |
| 5,717,945 A * | 2/1998 | Tamura | 715/235 |
| 5,765,152 A * | 6/1998 | Erickson | 707/9 |
| 5,870,552 A * | 2/1999 | Dozier et al. | 709/219 |
| 5,898,677 A * | 4/1999 | Deeley et al. | 370/276 |
| 5,996,093 A * | 11/1999 | Larsson | 714/49 |
| 2002/0114466 A1 * | 8/2002 | Tanaka et al. | 380/232 |

FOREIGN PATENT DOCUMENTS

| | | |
|---|---|---|
| JP | 2000-305854 | 11/2000 |
| JP | 2000-347851 | 12/2000 |
| WO | WO-99/38093 | 7/1999 |
| WO | WO 0062292 | 10/2000 |

OTHER PUBLICATIONS

Taro Yoshio, "Broadband he' Anote, Konote No. PS2", Nikkei Electronics, Nikkei Business Publications, Inc., 791:34-35 [2001].

* cited by examiner

FIG. 7

| CONTENT ID | ABLE TO BE CHECKED OUT | MAXIMUM NUMBER OF TIMES CHECK-OUT CAN BE PERFORMED | NUMBER OF TIMES CHECK-OUT CAN BE PERFORMED | ABLE TO BE MOVED | ABLE TO BE COPIED | NUMBER OF TIMES COPYING CAN BE PERFORMED | LIMIT OF USE | | PERMITTED AREA FOR USE | SIGNATURE | USER'S AREA | |
|---|---|---|---|---|---|---|---|---|---|---|---|---|
| | | | | | | | START DATE | TERMINATION DATE | | | | CHECK-OUT TIME |
| HASH1 | YES | 3 | 3 | YES | NO | — | — | — | JAPAN | XXYYSBYE | ... | 2001.3.1 |

INFORMATION PROCESSING APPARATUS

CROSS-REFERENCE TO RELATED APPLICATION

The present application is a national stage application under 35 U.S.C. § 371 of International Application No. PCT/JP02/02860filed Mar. 25, 2002, which claims priority from Japanese Application No. 2001-85661, filed Mar. 23, 2001, the disclosures of which are hereby incorporated by reference herein.

BACKGOUND OF THE INVENTION

1. Technical Field

The present invention relates to information processing apparatuses, and in particular, to an information processing apparatus designed to protect copyright even for content having no given identification information.

2. Background Art

Recently, MiniDiscs (hereinafter referred to as MD discs if necessary) have become widely used in place of cassette tapes. One of the reasons of the widespread use is that, in the case of cassette tapes, it is impossible to perform random accessing, while in the case of MDs, it is possible to perform random accessing.

In the MD system, the function of identifying content is not defined in specification. As a result, the system has a problem in that it is impossible to determine which piece of content is recorded and the copyright of content cannot be managed.

SUMMARY OF THE INVENTION

The present invention is made in view of the above-described circumstances and is intended to enable management of the copyright of content, even if identification information for identifying the content is not found.

In a first information processing apparatus, method, and program of the present invention, based on transmitted content, a computation value is computed by another information processing apparatus. Based on the computation value received from the other information processing apparatus, content management is performed.

In a second information processing apparatus, method, and program of the present invention, predetermined computation is performed based on content acquired from another information processing apparatus, and the computation value is transmitted to the other information processing apparatus. Based on the computation value transmitted to the other information processing apparatus, content management based on management information transmitted from the other information processing apparatus is performed.

In an information processing system of the present invention, a first information processing apparatus transfers content to a second information processing apparatus, and the second information processing apparatus performs predetermined computation based on the transferred content and transmits the computation value to the first information processing apparatus. The first information processing apparatus performs content management based on the computation value. The second information processing apparatus performs content management based on management information transmitted from the first information processing apparatus.

BRIEF DESCRIPTION OF THE DRAWINGS

FIG. 7 is an illustration of an example of usage conditions.

DETAILED DESCRIPTION

Figure 1:
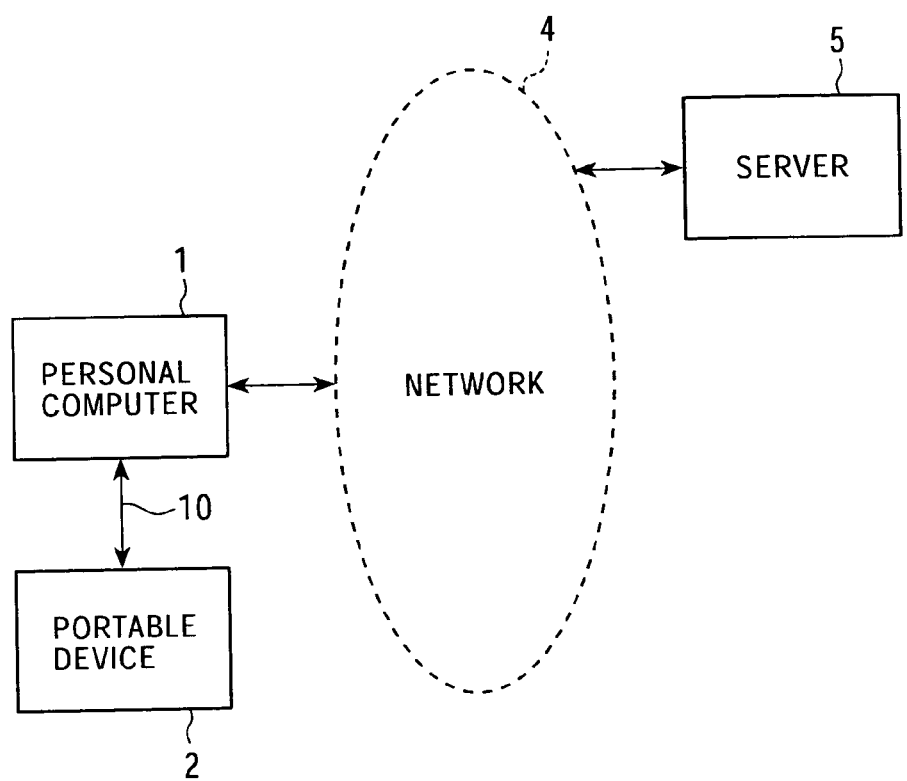
FIG. 1 is a block diagram showing an embodiment of an information processing system according to the present invention.

FIG. 1 is a block diagram showing an embodiment of an information processing system according to the present invention.

A personal computer 1 to which a portable device 2 is connected by a USB (Universal Serial Bus) cable 3 stores content that is provided from a server 5 through a network 4 such as the Internet or a local area network. The server 5 is formed by, for example, an EMD (Electrical Music Distribution) server or the like.

Content recorded in the personal computer 1, check-out, and check-in are described.

The personal computer 1 converts content as music data which is received from the server 5 linked to the network 4 or which is read from a CD (Compact Disc) to a predetermined compression format (e.g., ATRAC3 ™), and records the content in an encrypted form based on an encryption method such as the DES (Data Encryption Standard).

For the recorded content in the encrypted form, the personal computer 1 records usage-condition data representing conditions for using content.

The usage-condition data represents, for example, the number (the number of PDs that can be, so-called, checked out, which is described later) of portable devices (referred to also as PDs) 2 that can simultaneously use content corresponding to the usage-condition data. When content is checked out only the number of times which is represented by the usage-condition data, the personal computer 1 can play back the content.

The usage-condition data also indicates that the content can be copied. The number of times the content can be copied may be limited. The number of times the content can be copied does not increase.

The usage-condition data also indicates that the content can be moved to another personal computer or server. After the content is moved to the other personal computer or server, the content recorded in the personal computer 1 cannot be used (the content is deleted, or cannot be used due to a change in the usage condition).

The personal computer 1 executes a so-called check-out process in which the portable device 2 is controlled to store the received content in the encrypted form, with content-related data (e.g., a music name, playback conditions, etc.), by using the USB cable 10, and in association with the storing by the portable device 2, the usage-condition data corresponding to the stored content is updated.

In more detail, when content is checked out, the number of times check-out can be performed which is in the usage-condition data corresponding to the content and which is recorded in the personal computer 1 is reduced by 1. When the number of times check-out can be performed is 0, the corresponding content cannot be checked out.

The personal computer 2 executes, a so-called check-in process in which, in association with erasure by the portable device 2 of the content checked out to the portable device 2, the usage-condition data corresponding to the erased content is updated. In more detail, when content is checked in, the number of times check-out can be performed which is in the usage-condition data corresponding to the corresponding content and which is recorded in the personal computer 1 is increased by 1.

When check-out time set in the usage conditions corresponding to the content elapses, the portable device 2 erases the stored content. The process of the portable device 2 for erasing the content in association with the check-out time is hereinafter referred to also as the automatic check-in process of the portable device 2.

When check-out time set in the usage conditions corresponding to the content checked out to the portable device 2 elapses, the personal computer 1 increases the number of times check-out can be performed by 1. The process by the personal computer 1 of incrementing the number of times check-out can be performed, which is associated with the check-out time, is hereinafter referred to also as the automatic check-in process of the personal computer 1.

Based on data representing the detail of the content for which the check-out time is set, the personal computer 1 displays the detail of the content for which the check-out time is set. The personal computer 1 executes check-out in response to an operation of a user who selects, based on the detail of the content displayed, content to be checked out.

Figure 2:
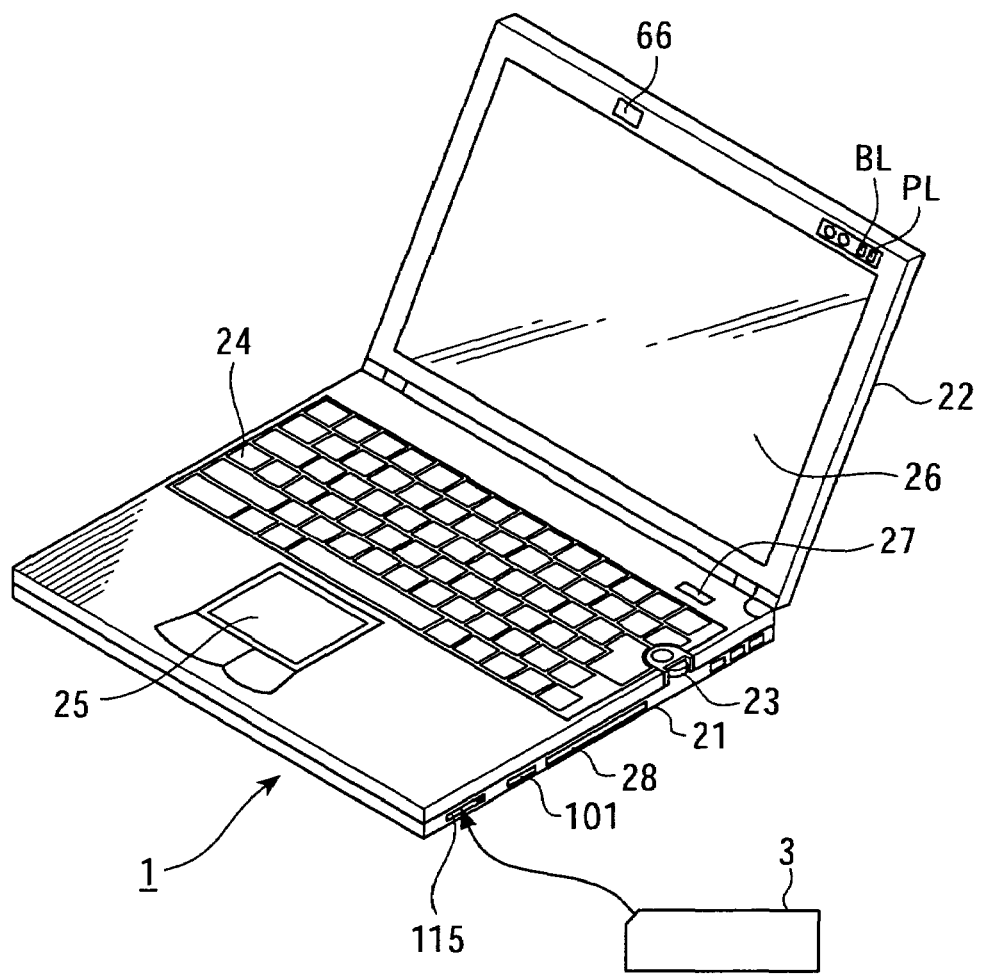
FIG. 2 is a perspective view showing the exterior of the personal computer shown in FIG. 1.
Figure 3:
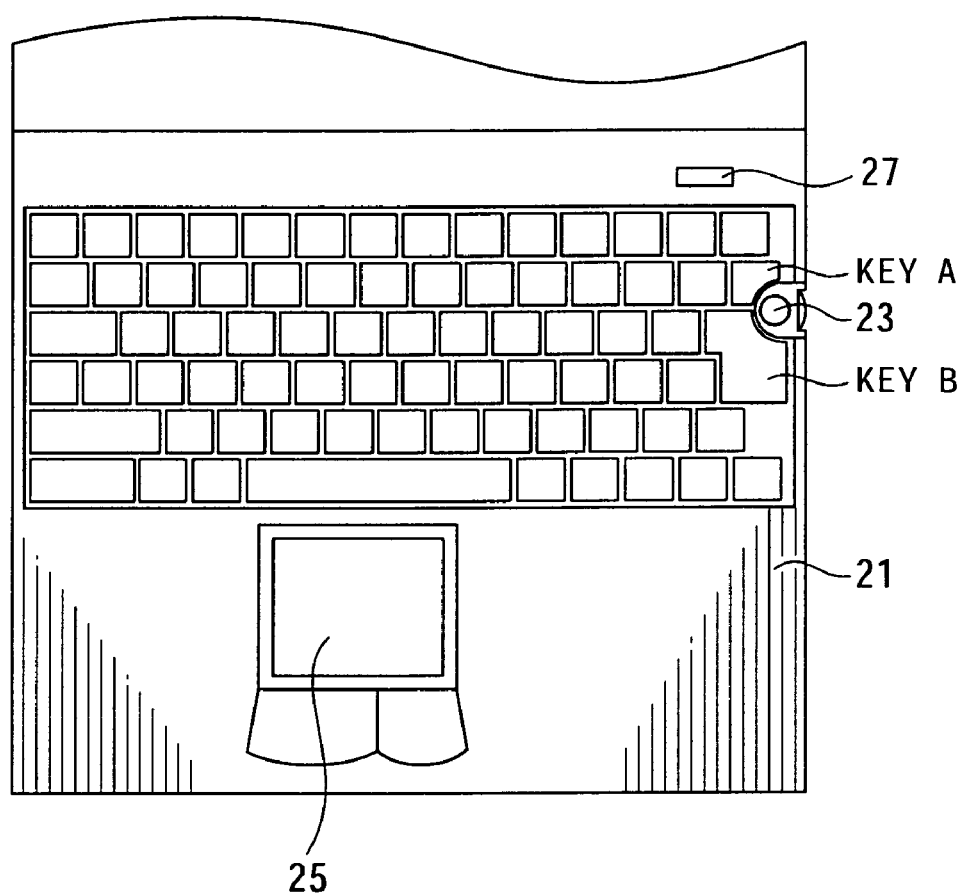
FIG. 3 is a plan view of part of the exterior of the personal computer shown in FIG. 1.
Figure 4:
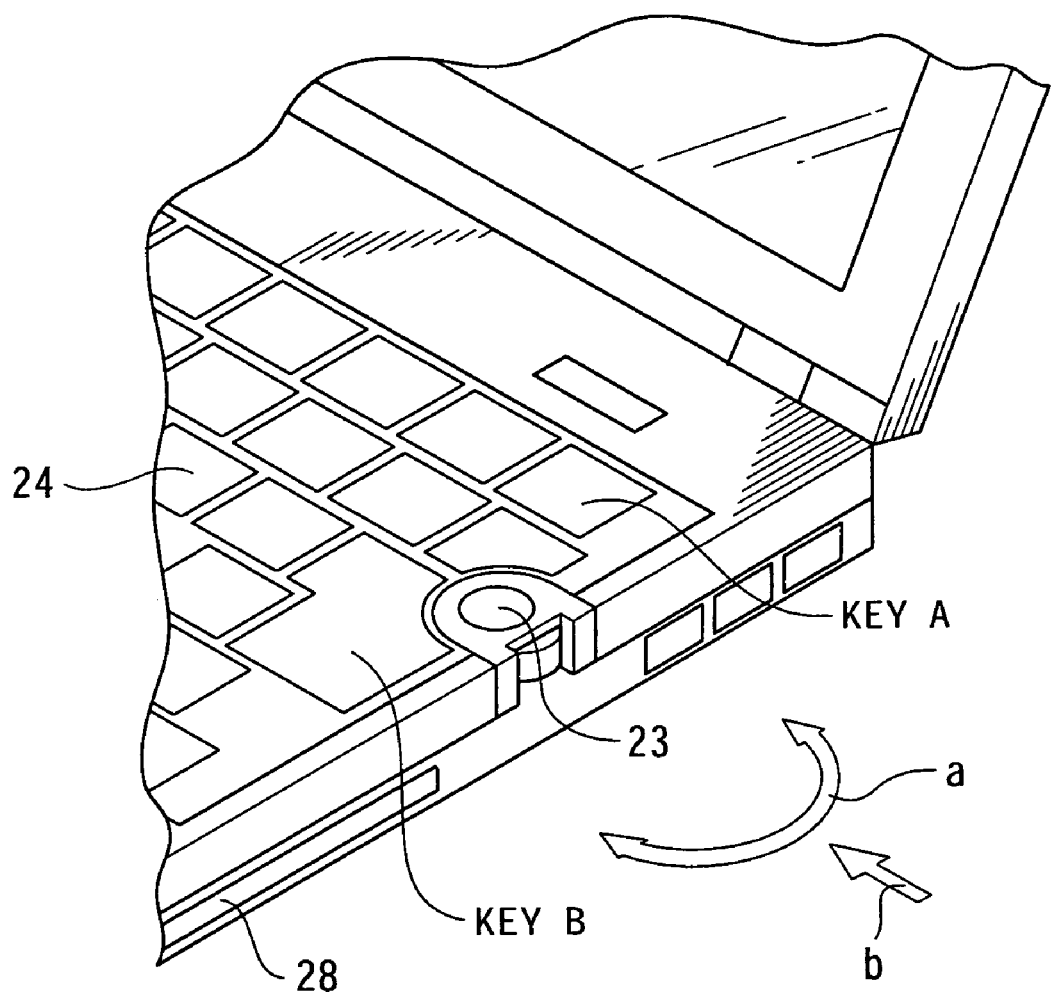
FIG. 4 is a plan view of part of the exterior of the personal computer shown in FIG. 1.
Figure 5:
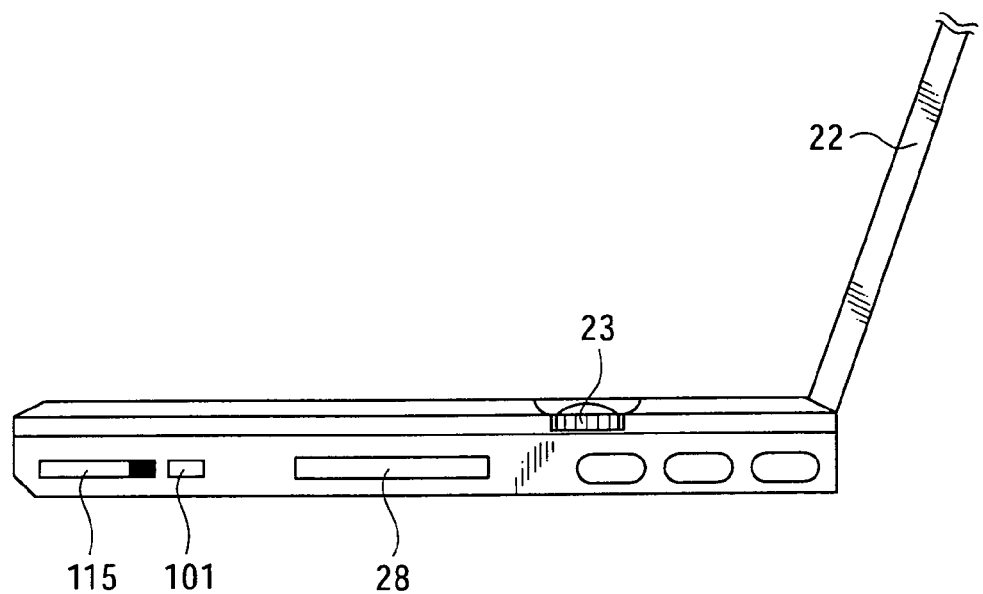
FIG. 5 is a side view showing the formation of the personal computer shown in FIG. 1.

FIG. 2 to FIG. 5 are illustrations of the personal computer 1 included in the information processing system according to the present invention. The personal computer 1 is basically constituted by a main unit 21, and a display unit 22 that can be opened and closed with respect to the main unit 21. FIG. 2 is a perspective exterior view showing a state in which the display unit 22 is open with respect to the main unit 21. FIG. 3 is a plan view of the main unit 21, and FIG. 4 is an enlarged view of a later described jog dial 23 provided to the main unit 21. Also, FIG. 5 is a side view of the jog dial 23 provided to the main unit 21.

The main unit 21 has, on the top surface thereof, a keyboard 24 that is operated when inputting various characters and symbols, a touch pad 25 as a pointing device that is operated for a case such as moving a pointer (mouse cursor) displayed on an LCD (Liquid Crystal Display) 26, and a power supply switch 27. It also has, on one side thereof, the jog dial 23, a slot 28, an IEEE (Institute of Electrical and Electronics Engineers) 1394 port 101, a memory slot card 115, etc. Instead of the touch pad 25, a pointing device of a stick type can be provided.

In addition, a picture displaying LCD 26 is provided on the front surface of the display unit 22. In the upper right portion of the display unit 22, lamps consisting of a power-supply lamp PL, a battery lamp BL, a message lamp ML (not shown), and other lamps are provided. A microphone 66 is provided in the upper portion of the display unit 22.

The power-supply lamp PL, a battery lamp BL, a message lamp ML, etc., can be provided in the lower portion of the display unit 22.

Next, the jog dial 23 is, for example, set between key A and key B disposed on the right side in FIG. 3 of the keyboard 24 on the main unit 21 so that the top surface thereof can be almost identical to key A and key B in height. The jog dial 23 executes a predetermined process (e.g., a screen scrolling process) in response to the rotational operation indicated by the arrow a in FIG. 4, and executes a process (e.g., a process for determining selection of an icon) corresponding to the moving operation indicated by the arrow b.

The jog dial 23 may be disposed on the left side of the main unit 21, or may be disposed on the right side or left side of the display unit of the display unit 22 having the LCD 26, or laterally between the G key and the H key of the keyboard 24 (i.e., so that the jog dial 23 can rotate in either Y-key or B-key direction).

Also, the jog dial 23 may be disposed in the central portion of the front surface of the main unit 21 so as to be operated by a thumb while operating the touch pad 6 with an index finger. Alternatively, it may be longitudinally disposed along the upper end line or lower end line of the touch pad 6, or may be laterally disposed between the right button and left button of the touch pad 6. The jog dial 23 may be obliquely disposed at a predetermined angle so as to be operated by each finger, without being limited to the lateral direction and the longitudinal direction. In addition to these, the jog dial 23 can be disposed in a position of a side of a mouse as a pointing device so that it can be operated by a thumb. A rotationally operable electronic component with a push switch which is disclosed in Japanese Unexamined Patent Application Publication No. 8-203387 and which has been filed by the present Applicant and a co-applicant can be used as a jog dial.

A PC card, as an expansion card based on a standard defined in the PCMIC (Personal Computer Memory Card International Association), is loaded into the slot 28.

The IEEE 1394 port 101 has a structure based on a standard defined in the IEEE 1394, and a cable based on the standard defined in the IEEE 1394 is connected thereto.

The memory card slot 115 has a built-in semiconductor memory such as a flash memory, and the memory card 3, such as, for example, a MemoryStick ™, which stores data such as still pictures, video, sound, and text, is loaded thereto.

Next, an example of the structure of the personal computer 1 is described with reference to FIG. 6.

A central processing unit (CPU) 51 is formed by, for example, a Pentium ™ processor made by Intel Corporation, etc., and is connected to a host bus 52. A bridge 53 (a so-called north bridge) is connected to the host bus 52. The bridge 53 has an AGP (Accelerated Graphic Port) 50 and is connected to a PCI (Peripheral Component Interconnect/Interface) bus 56.

The bridge 53 is formed by, for example, a 400BX that is an AGP Host Bridge Controller made by Intel Corporation, and controls data transmission, etc., of the CPU 51, a RAM (Random-Access Memory) 52 (so-called main memory), etc. The bridge 53 uses the AGP 50 to control data transmission with a video controller 57. The bridge 53 and a bridge (so-called south bridge (PCI-ISA Bridge) 58 constitute a so-called chip set.

The bridge 53 is connected to a cache memory 55. The cache memory 55 is formed by a memory that can execute a reading or writing operation faster than a RAM 54 such as a SRAM (StatIC RAM) 54, and caches (temporarily stores) a program or data that the CPU 51 uses.

The CPU 51 includes an internal, primary memory (memory that can operate faster than the cache memory 55).

The RAM 54 is formed by, for example, a DRAM (Dynamic RAM), and stores a program that the CPU 51 executes or the data required for the operation of the CPU 51. Specifically, for example, at the time activation is completed, the RAM 54 stores an electronic mail program 54A, an autopilot program 54B, a jog-dial-status monitor program 54C, a jog dial driver program 54D, an operating program (OS) 54E, an encryption/decryption program 54I, and other application programs 54H1 to 54Hn, which are loaded from the HDD 67.

The electronic mail program 54A is a program that exchanges messages (so-called electronic mail) through a communication link, which is not shown.

The autopilot program 54B is a program that sequentially activates and performs a plurality of predetermined processes (or programs), etc., in predetermined order.

The jog-dial-status monitor program 54C receives, from each of the above applications, a notification indicating whether the application is adapted for the jog dial 23, and, when the application is adapted, displays, on the LCD 26, what can be performed by operating the jog dial 23.

The jog-dial-status monitor program 54C detects an event (an operation such as rotations of the jog dial 23 in the directions denoted by arrow a in FIG. 4, or pressing of the jog dial 23 in the direction denoted by arrow b) by the jog dial 23, and executes the process corresponding to the detected event. The jog-dial-status monitor program 54C has a list for receiving notifications from the application programs. The jog dial driver program 54D executes various functions in response to the operation of the jog dial 23.

The OS (Operating System) 54E is a program for controlling computer's basic operations, which is typified by, for example, so-called Windows Me ™ by Microsoft Corporation or so-called Mac OS ™ by Apple Computer, Inc.

The content management program 54F manages, based on usage conditions stored in a usage condition file 76M, the use, such as playback, check-out, or check-in, of content stored in content files 67J recorded in the HDD 67. The content management program 54F sets check-out time in the user' area of the usage conditions stored in the usage condition file 67M.

When being requested by another personal computer 1 to check out content, the content management program 54F checks out the content to the other personal computer 1 through the network 4.

When receiving the checked-out content from the other personal computer 1, the content management program 54F supplies the checked-out content to the portable device 2 through a USB port 107.

The browser program 54G displays, based on data supplied from the server 5, pictures or characters on the LCD 26 by using the network 4, and reproduces sound from a speaker 65. In response to the operation of the keyboard 24 or the touch pad 25, the browser program 54G transmits, to the server 5 and through the network 4, data representing the detail of content in which the check-out time is set, the content ID of the content in which check-out time is set, and data representing a location storing the content in which check-out time is set.

The encryption/decryption program 54I performs calculation, encryption, and decryption processing on an MAC (Message Authentication Code) by, for example, using CBC (Cipher Block Chaining) of the DES (Data Encryption Standard).

A video controller 57 is connected to the bridge 53 by the AGP 50. It receives data (image data or text data, etc.) supplied from a CPU 51 and generates image data corresponding to the received data, or directly stores the received data in a built-in video memory. The video controller 57 controls the LCD 26 of the display unit 22 to display a picture according to the image data stored in the video memory.

A sound controller 64 is connected to a PCI bus 56. The sound controller 64 captures a signal corresponding to sound from the microphone 66, generates data corresponding to the sound, and outputs the data to the RAM 54. The sound controller 64 also drives the speaker 65 and outputs the sound from the speaker 65.

A PC card interface 111 is connected to the PCI bus 56. It supplies the CPU 51 or the RAM 54 with data supplied from an interface card 112 which is loaded into the slot 28, and outputs, to the interface card 112, data supplied from the CPU 51. A drive 113 is connected to the PCI bus 56 by the PC card interface 111 and the interface card 112.

The drive 113 reads data recorded in a magnetic disk 121, an optical disk 122, a magnetooptical disk 123, or a semiconductor memory 124 which is loaded, and supplies the read data to the RAM 54 through the PC card interface 111, the interface card 112, and the PCI bus 56.

A memory card interface 114 is connected to the PCI bus 56. It supplies the CPU 51 or the RAM 54 with, for example, content supplied from the memory card 3, which is loaded into the memory card slot 115, and outputs, for example, content supplied from the CPU 51.

A modem 116 is connected to the PCI bus 56. The modem 116 transmits predetermined data to the network 4 through a public telephone circuit 117 and an Internet service provider 118.

A bridge 58 (so-called south bridge) is also connected to the PCI bus 56. The bridge 58 is formed by, for example, PIIX4E made by Intel Corporation, or the like, and includes an IDE (Integrated Drive Electronics) controller/configuration register 59, a timer circuit 60, and IDE interface 61, and a USB (Universal Serial Bus) interface 68. The bridge 58 performs various types of I/O (Input/Output) control, such as control of devices connected to the IDE bus 62 or of devices connected by an ISA/EIO (Industry Standard Architecture/Extended Input Output) bus 63 or an I/O interface 69.

The IDE controller/configuration register 59 is constituted by two IDE controllers, a so-called primary IDE controller and secondary IDE controller, a configuration register, etc (any one not shown).

The HDD 67 is connected to the primary IDE controller by the IDE bus 62. When a so-called IDE device, such as a CD-ROM drive or an HDD which is not shown, is joined to another IDE bus, the joined IDE bus is electrically connected to the secondary IDE controller.

In the HDD 67: an electronic mail program 67A; an autopilot program 67B; a jog-dial-status monitor program 67C; a jog dial driver 67D; an OS 67E; a content management program 67F, a browser program 67G, and encryption/decryption program 67I as application programs; a plurality of other application programs 67H1 to 67Hn, etc., are recorded. The electronic mail program 67A, the autopilot program 67B, the jog-dial-status monitor program 67C, the jog dial driver 67D, the OS 67E, the content management program 67F, the browser program 67G, the encryption/decryption program 67I, the application programs 67H1 to 67Hn, etc., recorded in the HDD 67, are sequentially supplied and loaded into the RAM 54 in the process of, for example, activation (bootup).

In the HDD 67, a usage condition file 67M containing usage conditions of content, and content files 67J containing content are recorded.

The USB interface 68 transmits data or command, etc., to the portable device 2 connected thereto, and receives data or command, etc., from the portable device 2.

In response to a request from the content management program 67F, the timer circuit 60 supplies present-time representing data to the CPU 51 through the PCI bus 56. Based on the present-time representing data supplied from the timer circuit 60, the content management program 67F can know an elapse time, etc.

The I/O interface 69 is connected to the ISA/EIO bus 63. The I/O interface 69 is formed by an embedded controller, and its inside, a ROM 70, a RAM 71, and a CPU 72 are mutually connected.

The ROM 70 stores beforehand an IEEE 1394 interface program 70A, an LED control program 70B, a touch-pad-input monitor program 70C, a key-input monitor program 70D, a wakeup program 70E, and a jog-dial-status monitor program 70F.

The IEEE 1394 interface program 70A transmits and receives data (data stored in packets) in accordance with the standard defined in the IEEE 1394 through an IEEE 1394 port 101. The LED control program 70B controls lighting of the lamps consisting of the power-supply lamp PL, the battery lamp BL, the message lamp ML if necessary, or other LEDs. The touch-pad-input monitor program 70C is a program for monitoring an input from the touch pad 6 which corresponds to an operation by a user.

The key-input monitor program 70D is a program for monitoring inputs from the keyboard 24 or other key switches. The wakeup program 70E is a program for managing power supplies to chips constituting the personal computer 1 in order to activate a predetermined process (or program) or the like at a preset time by, based on the present-time representing data supplied from the timer circuit 60 in the bridge 58, performing checking about whether the preset time has come. The jog-dial-status monitor program 70F is a program for constantly monitoring the jog dial 23 about whether or not it is pressed.

In the ROM 70, a BIOS (Basic Input/Output System) 70G is written. The BIOS 70G controls data exchange (input/output) between the OS or an application program and the peripheral unit (the touch pad 6, the keyboard 24, or the HDD 67, etc.).

The RAM 71 includes, as registers 71A to 71F, registers for LED control, the touch pad input status, the key input status, and the set time, a register for monitoring the jog dial status, and an IEEE 1394 I/F register. For example, when pressing the jog dial 23 activates the electronic mail program 54A, a predetermined value is stored in the LED control register, and lighting of the message lamp Ml is controlled in accordance with the stored value. When the jog dial 23 is pressed, a predetermined operation-key flag is stored in the key-input-status register. In the set-time register, a predetermined time is set in response to the operation of the keyboard 24 by the user.

The codec unit 131 performs coding or decoding on audio data in any of PCM (Pulse Code Modulation), ATRAC (Adaptive Transform Acoustic Coding) 3, and MP3 (MPEG-1 Audio Layer-3).

Also, connectors, whose illustration is omitted, are used to connect the jog dial 23, the touch pad 6, the keyboard 24, the IEEE 1394 port 101, etc., to the I/O interface 69, and it outputs, to the ISA/EIO bus 63, each signal corresponding to the operation of the jog dial 23, the touch pad 6, or the keyboard 24. The I/O interface 69 controls data transmission and reception with the connected units. In addition, lamps consisting of a power-supply lamp PL, a battery lamp BL, a message lamp ML, a power-supply control circuit 73, and other LEDs are connected to the I/O interface 69.

The power-supply control circuit 73 are connected to a built-in battery 74 or an AC power supply, and supplies necessary power to each block and performs controls for charging the built-in battery 74 or second batteries of peripheral units. The I/O interface 69 monitors the power-supply switch 27, which is operated when turning on or off the power supply.

The I/O interface 69 executes the IEEE 1394 interface program 70A to the jog-dial-status monitor program 70F by using an internally provided power supply, even if the power supply is in an off state. In other words, the IEEE 1394 interface program 70A to the jog-dial-status monitor program 70F constantly operates.

Accordingly, even when the power-supply switch 27 is turned off and the CPU 51 does not execute the OS 54E, the I/O interface 69 executes the jog-dial-status monitor program 70F. Thus, when the jog dial 23 is pressed under a power-saving state or a power-supply-off state, the personal computer 1 activates predetermined software or script file processing that is set beforehand.

The personal computer 1 does not need to have a dedicated key because the jog dial 23 has a programmable power key (PPK) function.

FIG. 7 is an illustration of an example of usage conditions stored in the usage condition file 67M. The content ID is data for specifying content stored in each of the content files 67J. In the ABLE TO BE CHECKED OUT field, either value of "YES" and "NO" is set. When "YES" is set, the content management program 54F can check out, to the portable device 2 or another personal computer, content specified by the content ID. When "NO" is set in the ABLE TO BE CHECKED OUT field, the content management program 54F does not check out, to the portable device 2 or another personal computer, content specified by the content ID.

In the MAXIMUM NUMBER OF TIMES CHECK-OUT CAN BE PERFORMED field, the maximum number of times the content management program 54J can check out the corresponding content files 67J is set. The maximum number of times check-out can be performed cannot be changed.

In the NUMBER OF TIMES CHECK-OUT CAN BE PERFORMED field, the number of times the content management program 54F can check out any of the corresponding content files 67J is set. When the content management program 54F executes check-out once, the number of times check-out can be performed is decremented. When the content management program 54F executes check-in once, the number of times check-out can be performed is incremented.

When any of the content files 67J is not checked out even once, a value identical to the maximum number of times check-out can be performed is set as the corresponding number of times check-out can be performed.

When the number of times check-out can be performed is changed from "1" to "0" by changing check-out, "NO" is set in the ABLE TO BE CHECKED OUT field. When the number of times check-out can be performed is changed from "0" to "1" by changing check-out, "YES" is set in the ABLE TO BE CHECKED OUT field.

Either value of "YES" and "NO" is set in the ABLE TO BE MOVED field. When "YES" is set, the content management program 54F can move the content specified by the content ID. When "NO" is set in the ABLE TO BE MOVED field, the content management program 54F does not move the content specified by the content ID.

In the ABLE TO BE COPIED, either value of "YES" and "NO" is set. When "YES" is set, the content management program 54F can copy the content specified by the content ID. When "NO" is set in the ABLE TO BE COPIED, the content management program 54F does not copy the content specified by the content ID.

In the NUMBER OF TIMES COPYING CAN BE PERFORMED, the number of times that the content management program 54F can execute copying is set.

In the LIMIT OF USE, a period in which the content specified by the content ID can be used (checked out, played back, etc.) is described.

In the PERMITTED AREA FOR USE, an area (e.g., Japan or all the world) in which the content specified by the content ID can be used (checked out, played back, etc.) is described.

In the SIGNATURE, signature data found by computation based on data set in the fields from the CONTENT ID to the PERMITTED AREA FOR USE is stored. The signature data is used to detect falsification of the usage conditions. Because an algorithm for generating the signature data is a unidirectional function and is not opened, it is difficult for one except a supplier of the content management program 54F to generate correct signature data based on the data set in the CONTENT ID to the PERMITTED AREA FOR USE.

In the USER'S AREA of the usage conditions, a check-out time is set.

The content management program 54F determines whether or not the check-out time corresponding to the checked-out content has passed. When it is determined that the check-out time has passed, the NUMBER OF TIMES CHECK-OUT CAN BE PERFORMED is incremented similarly to the case of executing check-in once.

When the content is checked out, the check-out time is supplied to the portable device 2 with the content. The portable device 2 stores the check-out time as well as the content in the memory card 3.

The portable device 2 determines whether the check-out time stored in the USER'S AREA in the usage conditions corresponding to the content has passed. When it is determined that the check-out time has passed, the corresponding content is erased.

Figure 8:
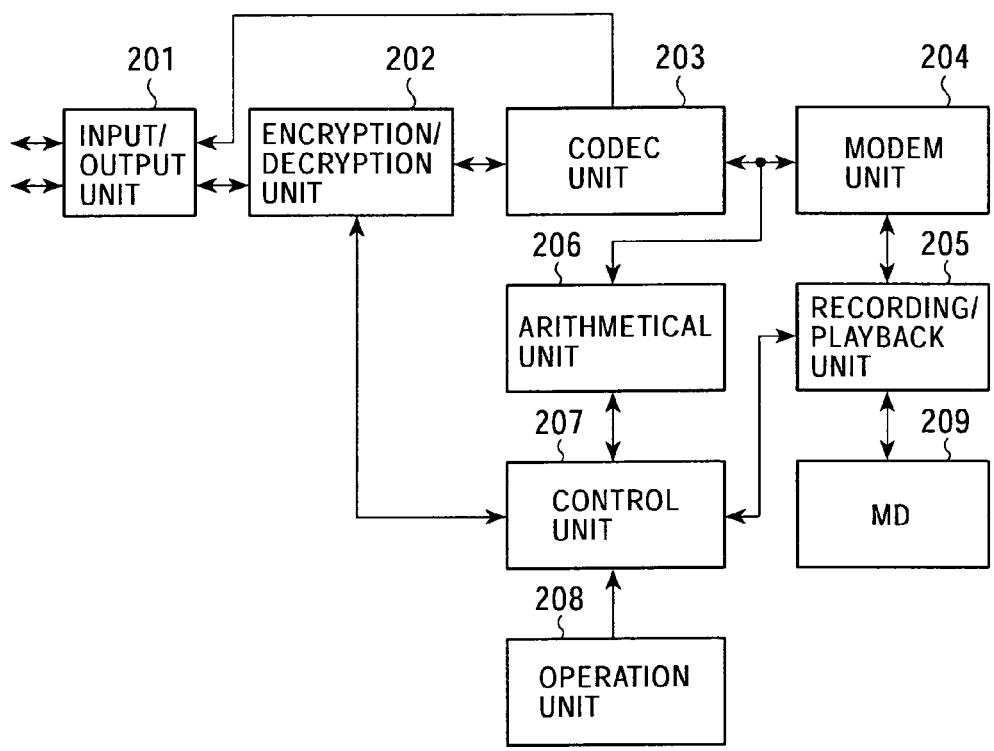
FIG. 8 is a block diagram showing the internal structure of the MD deck shown in FIG. 1.

FIG. 8 shows the structure of an MD deck 200 as an example of the portable device 2 in FIG. 1. An input/output unit 201 inputs/outputs data to/from the personal computer 1 through a USB cable 10, and inputs/outputs data to/from another apparatus which is not shown. For example, the input/output unit 201 outputs, from a speaker and an earphone, etc., which are not shown, a signal supplied from a codec unit 203 or an encryption/decryption unit 202. When the data supplied from the input/output unit 201 is encrypted, the encryption/decryption unit 202 decrypts the data and outputs the data to the codec unit 203. Also, when it is necessary to encrypt data supplied from the codec unit 203 or a control unit 207, the encryption/decryption unit 202 encrypts the supplied data and outputs the data to the input/output unit 201.

The codec unit 203 uses either ATRAC (Adaptive Transform Acoustic Coding) 1 or ATRAC 3 method to perform coding on the data supplied from the encryption/decryption unit 202, and outputs the data to a modem unit 204 and a arithmetical unit 206. The codec unit 203 decodes the data supplied from the modem unit 204 and outputs the data to the input/output unit 201.

The modem unit 204 modulates the data supplied from the codec unit 203 and supplies the data to a recording/playback unit 205, and demodulates data supplied from the recording playback unit 205 and supplies the data to the codec unit 203.

The arithmetical unit 206 extracts, from the data supplied from the codec unit 203, a predetermined portion which is specified beforehand, computes a hash value of the extracted portion, and outputs the computational result to the control unit 207. The control unit 207 supplies the encryption/decryption unit 202 with the hash value supplied from the arithmetical unit 206, and controls it to encrypt the hash value and to output the encrypted value to the personal computer 1 from the input/output unit 201 through the USB cable 3.

The recording/playback unit 205 records the data supplied from the modem unit 204 in a predetermined track of a Mini-Disc (MD) 209. The recording/playback unit 205 also plays back the data recorded in the MD 209 and outputs the played-back data to the modem unit 204. In addition, the recording/playback unit 205 outputs, to the control unit 207, data which is played back from the TOC (Table of Content) field of the MD 209. Based on the TOC data supplied from the recording/playback unit 205, the control unit 207 controls playback, and records, when predetermined content is recorded on the MD 209, TOC data such as its recording address in the TOC field.

An operation unit 208 is operated by the user and outputs, to the control unit 207, a signal corresponding to the operation. By outputting the control signal corresponding to the operation to each unit, the control unit 207 controls recording or playback of the content in the MD 209.

Figure 9:
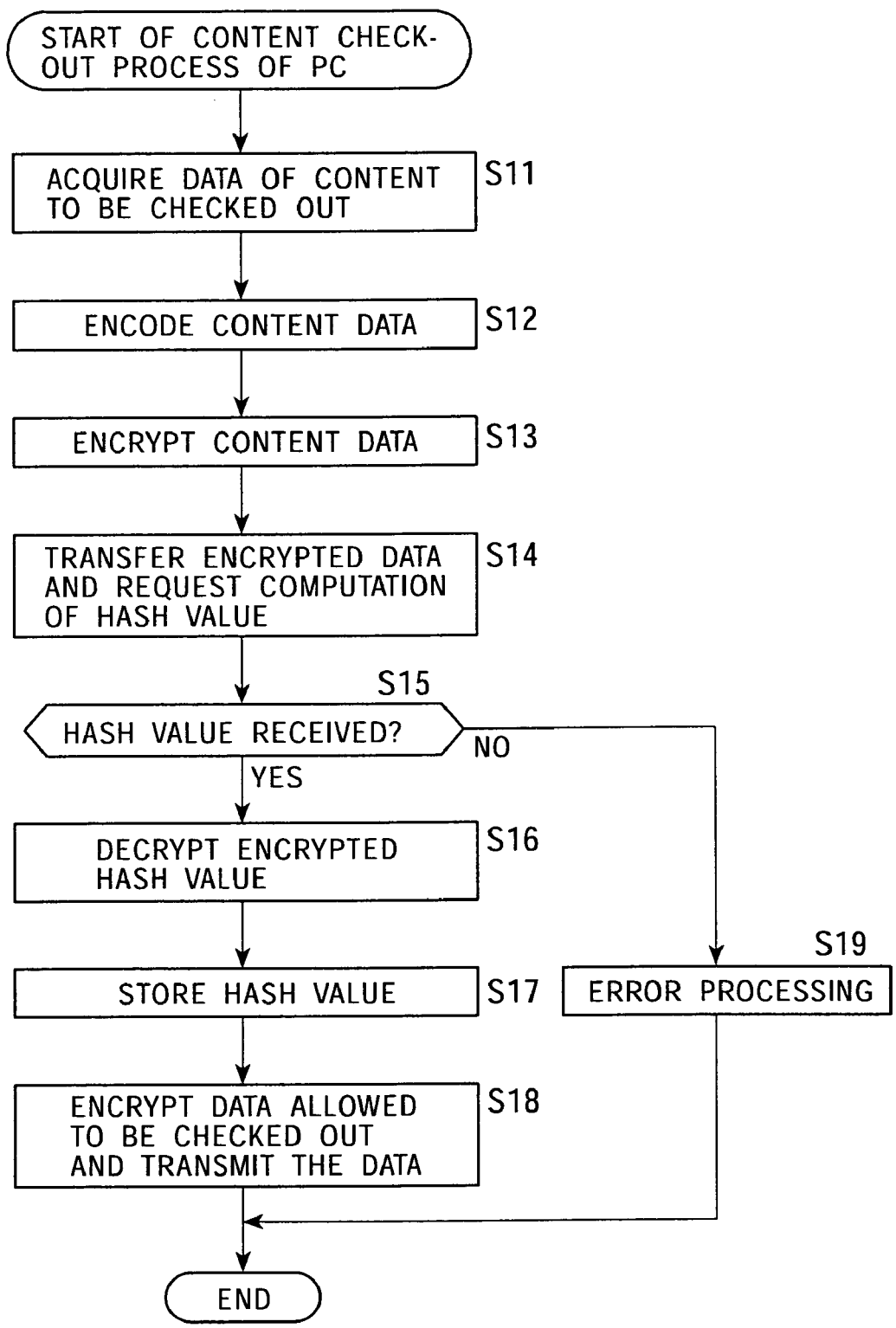
FIG. 9 is a flowchart illustrating a content check-out process of a personal computer.
Figure 10:
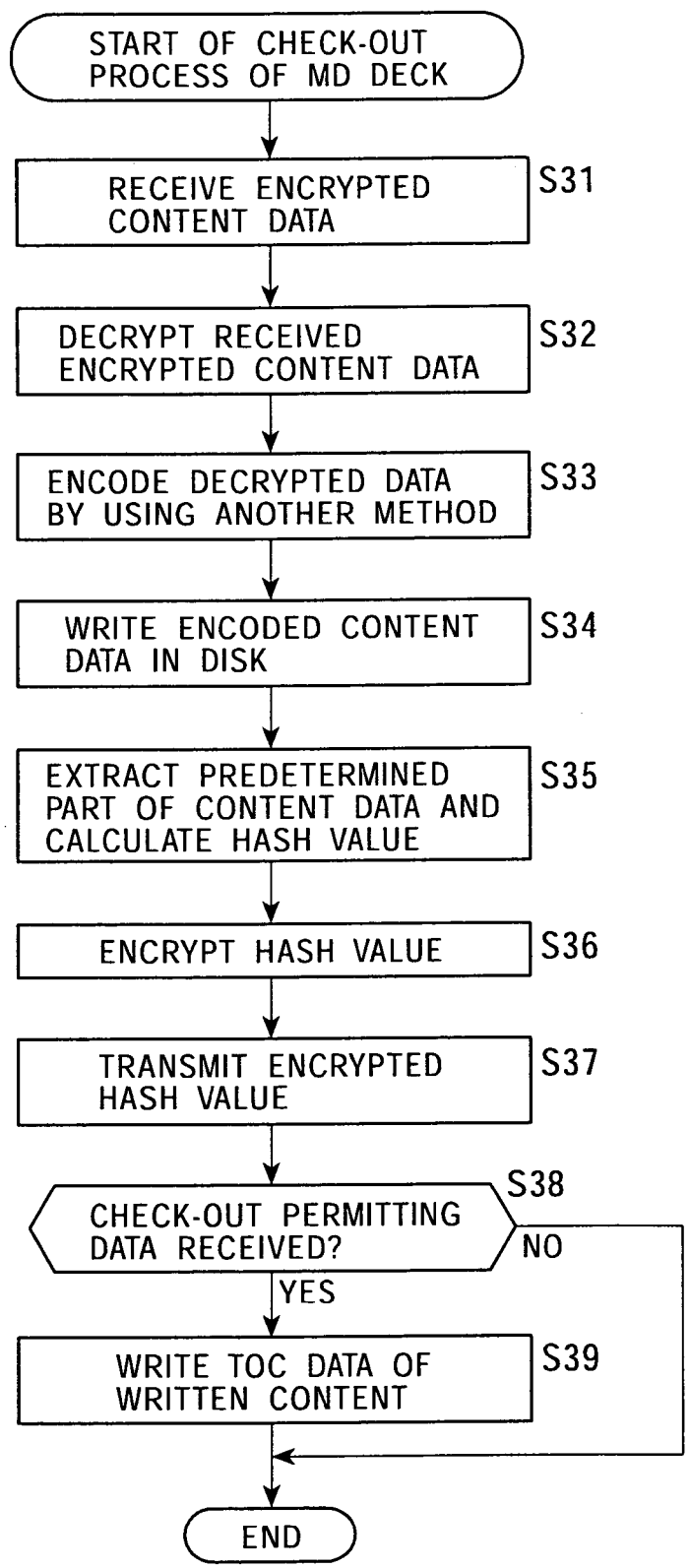
FIG. 10 is a flowchart illustrating a check-out process of an MD deck.

Next, referring to the flowchart in FIG. 9, a process in which content recorded in the content files 67J in the HDD 67 in the personal computer 1 is played back and checked out to the MD 209 is described with reference to the flowchart in FIG. 9 and the flowchart in FIG. 10. The flowchart in FIG. 9 indicates a process of the personal computer 1, and the flowchart in FIG. 10 indicates a process of the MD deck 200. First, a check-out process of the personal computer 1 is described with reference to the flowchart in FIG. 9. This process is basically based on the content management program 54F (67F) and is executed by the CPU 51.

In step S11, when the user operates the jog dial 23, the keyboard 24, or the touch pad 23 to designate content to be checked out, the CPU 51 (content management program) acquires data of the designated content from the content files 67J in the HDD 67.

In step S12, the CPU 51 supplies the codec unit 131 with the content data acquired in the process of step S11, and controls it to encode the data in a predetermined method. For example, content data encoded in the MP3 method is encoded in the PCM method.

Next, in step S13, the CPU 51 performs a process that encrypts the content data encoded in the process of step S12. This encrypting process is performed by the encryption/decryption program 54I. The encryption/decryption program 54I performs the CBC in the DES. Also, the MAC is used to verify no falsification.

In step S14, the CPU 51 transfers the content data encrypted in the process of step S13 to the MD deck 200, and executes a process that requests hash value computation. In other words, the encrypted content data is transferred to the MD deck 200 as the portable device 2 through the bridge 58, the USB interface 68, the USB port 107, and the USB cable 10.

As described later, in the MD deck 200, a hash value based on content data is computed, encrypted, and transmitted (step S35 to step S37 in FIG. 10 which are described later). Accordingly, in step S15, the CPU 51 (the encryption/decryption program 54I) determines whether or not it has received the encrypted hash value. When it has received, it proceeds to step S16, and decrypts the encrypted hash value. In step S17, the CPU 51 records the hash value (HASH1) decrypted in the process of step S16, as the content ID of the content, in the usage condition file 67M (FIG. 7).

In step S18, the CPU 51 encrypts data for permitting the MD deck 200 to perform check-out, and transmits the data. As described with reference to the flowchart in FIG. 10, n the MD deck 200, based on this permitting data, a process (check-out process) for writing the TOC data of the content is performed (step S39).

The CPU 51 also decrements the number of times check-out can be performed of the content by 1. For example, in the example in FIG. 7, the present number of times check-out can be performed is "3". Accordingly, this value is changed to "2".

In step S15, when it is determined that the hash value has not been received, the CPU 51 proceeds to step S19, and it executes error processing. In other words, at this time, the content check-out process is not performed.

Next, a check-out process of the MD deck 200 is described with reference to the flowchart in FIG. 10.

In step S31, the input/output unit 201 receives the encrypted data which is transferred by the personal computer 1 in the process of step S14. The input/output unit 201 supplies the received content data to the encryption/decryption unit 202. In step S32, the encryption/decryption unit 202 decrypts the encrypted content data and outputs the data to the codec unit 203.

The codec unit 203 encodes, in step S33, the content data decrypted in the process of step S32 so that the content data is adapted for a predetermined method permitted in the Mini-Disc system. In the present case, the content data encrypted in the PCM method is encrypted in, for example, the ATRAC1 method.

Next, proceeding to step S34, the control unit 207 executes a process that writes the content data encrypted in the process of step S33 into the MD 209. In other words, at this time, the modem unit 204 is controlled by the control unit 207, modulates the data which is encrypted in the ATRAC1 method and which is supplied from the codec unit 203, and outputs the modulated data to the recording/playback unit 205. The recording/playback unit 205 records, in the MD 209, the content data supplied from the modem unit 204.

In this way, audio data encoded in the method (ATRAC1 or ATRAC3) permitted in the MiniDisc system is written into the MD 209. The MD 209 becomes able to be played back by another MD player.

The arithmetical unit 206 extracts, in step S35, extracts a predetermined portion from the content data supplied from the codec unit 203, and computes its hash value. In this computation, the overall length of the content is divided into, for example, quarters, the hash value of each of the 2/4 portion and 3/4 portion, for example, of data in the 0.5-second range from the top, is computed. The 1/4 portion or the 4/4 portion is not used since it has an anacoustic range in many cases.

Next, in step S36, the control unit 207 receives and supplies the hash value computed by the arithmetical unit 206 to the encryption/decryption unit 202, and controls it to encrypt the hash value. The encryption/decryption unit 202 encrypts the hash value in the CBC in the DES, and supplies the value to the input/output unit 201.

In step S37, the input/output unit 301 transmits, to the personal computer 1, the encrypted hash value supplied from the encryption/decryption unit 202 through the USB cable 10.

As described above, the hash value is stored in the usage condition file 67M in the HDD 67 in the personal computer 1 (step S17), and based on it, check-out permitting data is encrypted and transmitted from the personal computer 1 (step S18).

Accordingly, in step S38, the control unit 207 in the MD deck 200 determines whether or not it has received checkout permitting data from the personal computer 1.

In other words, when data is transmitted from the personal computer 1 through the USB cable 10, the input/output unit 201 receives and supplies the data to the encryption/decryption unit 202. The encryption/decryption unit 202 decrypts the input, encoded data and outputs the decoded result to the control unit 207. By reading the data supplied from the encryption/decryption unit 202, the control unit 207 can determine whether or not the check-out permitting data has been received.

When the check-out permitting data has been received, proceeding to step S39, the control unit 207 generates the TOC data corresponding to the content written in the process of step S34, supplies the TOC data to the recording/playback unit 205, and records the TOC data in the TOC field of the MD 209. This records, as the TOC data, the address information, etc., of the content written in the process of step S34.

After the TOC is recorded in the MD 209, by reading it, the corresponding content becomes able to be played back. In other words, if the content is recorded in the process of step 34, when the corresponding TOC data is not written, an MD deck or an MD player into which the MD 209 is loaded cannot play back the content from the MD. By writing the TOC data corresponding to the TOC data in the process of step S39, the content becomes able to be read.

In step S38, when it is determined that the check-out permitting data has not been received, the process of step S39 is skipped. In other words, since no TOC data is written in this case, the content data written in the process of step S34 becomes inability to be played back (becomes a state similar to a substantially unwritten state).

After the content and the TOC data corresponding thereto are written in the MD 209 in the above method, the MD deck 200 becomes able to play back the content recorded in the MD 209.

In other words, when the operation unit 208 is operated by the user to command playback of the content, the control unit 207 controls the recording/playback unit 205 to play back the designated content from the MD 209. The played-back data is supplied and demodulated in the modem unit 204, and is supplied to the codec unit 203. The codec unit 203 uses the ATRAC1 method in the present case to decrypt the data supplied from the modem unit 204, and supplies the data obtained by the decryption to the input/output unit 201. The input/output unit 201 performs D/A conversion on the data supplied from the codec unit 203, and outputs the converted data from an earphone or a speaker which is not shown.

Figure 11:
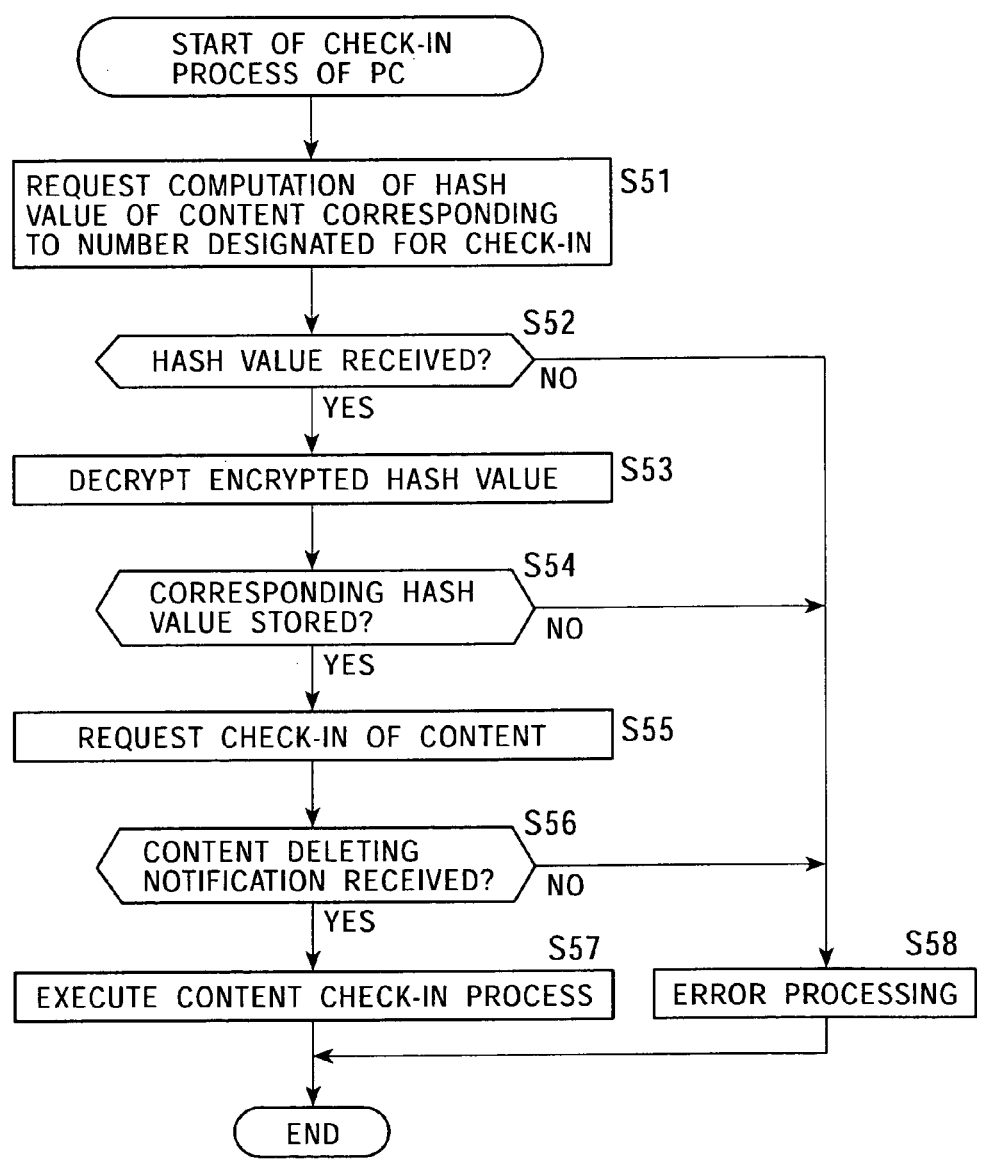
FIG. 11 is a flowchart illustrating a check-in process of a personal computer.
Figure 12:
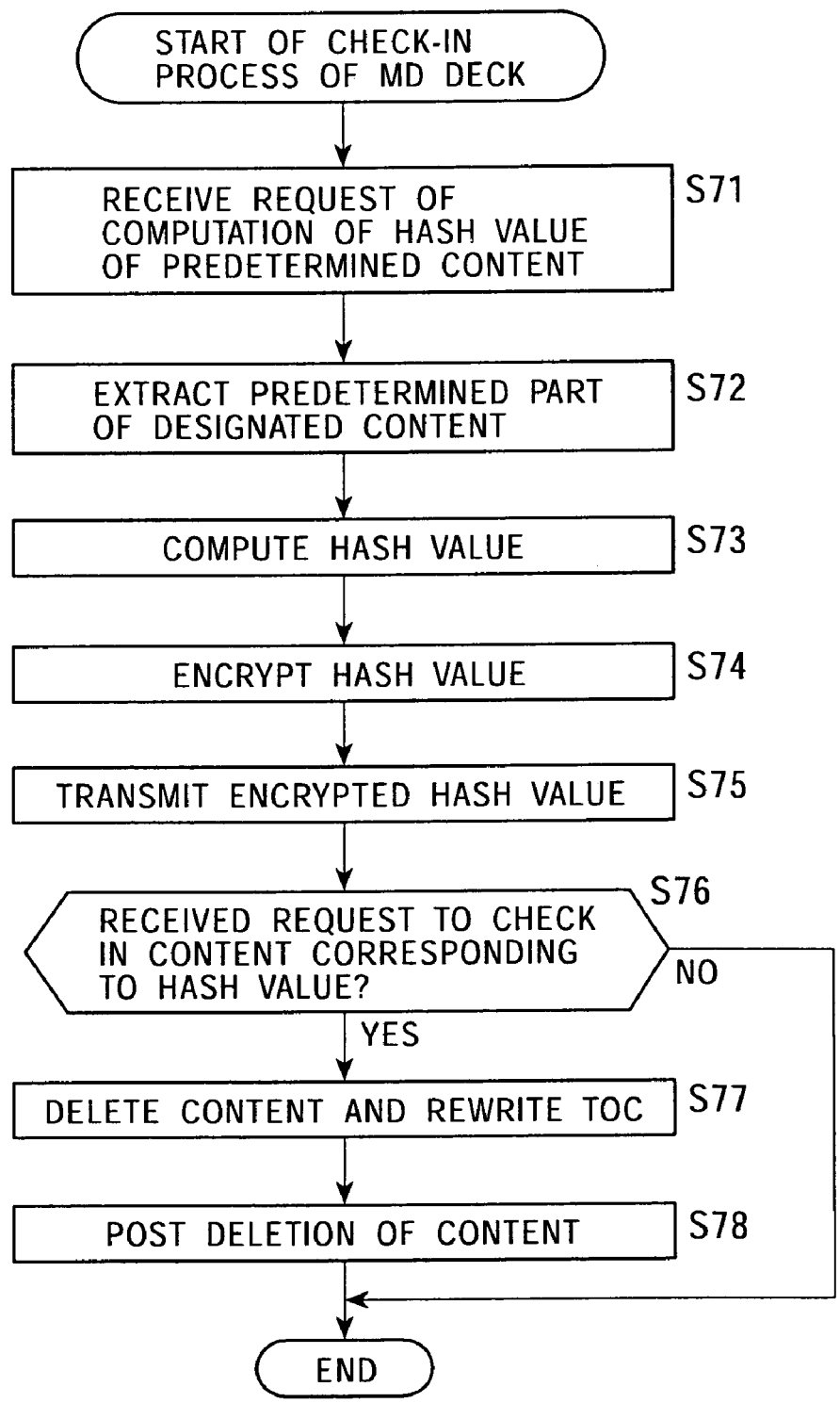
FIG. 12 is a flowchart illustrating a check-in process of an MD deck.

Next, check-in processing is described with reference to the flowcharts in FIG. 11 and FIG. 12. FIG. 11 shows a check-in process of the personal computer 1, and FIG. 12 shows a check-in process of the MD deck 200.

First, the check-in process in FIG. 11 of the personal computer 1 is described. This process is executed basically based on the content management program 54F by the CPU 51 when check-in of predetermined content is designated by operating, by the user, the jog dial 23, the keyboard 24, or the touch pad 25.

In step S51, the CPU 51 requests the MD deck 200 to compute a hash value of content to be checked in which is designated by the user. As described later with reference to FIG. 12, based on this request, the MD deck 200 computes the hash value of the designated content, encrypts the value, and transmitted the encrypted value (step S72 to step S75).

Accordingly, in step S52, the CPU 51 determines whether or not it has received the hash value. When it has received the value, it proceeds to step S53, and uses the encryption/decryption program 54I to decrypt the encrypted hash value.

In step S54, the CPU 51 finds whether or not the hash value obtained by decryption in step S53 is stored as the content ID (FIG. 7) in the database (the usage condition file 57M) of the HDD 67. When he hash value obtained by decryption in step S53 is stored as the content ID, the CPU 51 proceeds to step S55, and requests the MD deck 200 to check in the designated content.

When receiving this check-in request, the MD deck 200 deletes the corresponding content, as described later, and transmits a content-deletion notification in an encrypted form (steps S77 and S78).

Accordingly, in step S56, the CPU 51 determines whether or not it has received the content-deletion notification. When it has received, proceeding to step S57, it executes the check-in process. Specifically, for example, the number of times check-out can be performed, which is shown in FIG. 7, is incremented from "2" to "3" by 1.

When it is determined in step S52, that the hash value has not been received from the MD deck 200 despite requesting the hash value computation, when it is determined in step S54 the corresponding hash value is stored, or when it is determined in step S56 that the content-deletion notification has not been received, the CPU 51 proceeds to step S58 and executes error processing. In other words, in these cases, it is found that the designated content is not content managed by the personal computer 1, or the other apparatus is an unauthorized MD deck, so that the check-in process cannot be executed.

Next, the check-in process of the MD deck 200 is described with reference to the flowchart in FIG. 12.

First, in step S71, the control unit 207 receives, from the personal computer 1, the request to compute the hash value of the predetermined content. In other words, when the personal computer 1 requests the hash value computation in step S51, as described above, this request is decrypted by the encryption/decryption unit 202 and is supplied to the control unit 207. When receiving the request, the control unit 207 controls the recording/playback unit 200 in step S72 to play back the predetermined portion of the requested content and to extract its data.

In step S73, the control unit 207 supplies the arithmetical unit 206 with the content data extracted in the process of step S72, and controls it to compute the hash value. In step S74, the control unit 207 supplies the encryption/decryption unit 202 with the hash value computed in step S73, and controls it to encrypt the value. In step S75, the input/output unit 201 transmits, to the personal computer 1 and through the USB cable 10, the encrypted hash value which is supplied from the encryption/decryption unit 202.

As described above with reference to FIG. 11, when receiving the hash value, the personal computer 1 requests the check-in of the content (step S55). Accordingly, in step S76, the control unit 207 determines whether or not it has received the content check-in request. When it has received, it proceeds to step S77, and controls the recording/playback unit 205 to deletes the content recorded in the MD 209. The control unit 205 controls the recording/playback unit 205 to rewrite the TOC data in response to the content deletion.

Next, in step S78, the control unit 207 controls the encryption/decryption unit 202 to encrypt a notification representing the content deletion, and to notify the personal computer 1.

As described above, the personal computer 1 executes the check-in process (step S57).

When it is determined in step S76 that no content check-in request is transmitted from the personal computer 1, the processes of step S77 and S78 are skipped. In other words, in this case, the check-in process is not executed.

Although, in the foregoing, a hash value is computed only for content designated as content to be checked out (the check-in process can be completed in a short time by computing only the hash value of the designated content in this way since hash value computation relatively needs time), it is possible that hash values of all pieces of the content be computed beforehand and stored. The process in this case is described with reference to the flowcharts in FIG. 13 and FIG. 14.

Figure 13:
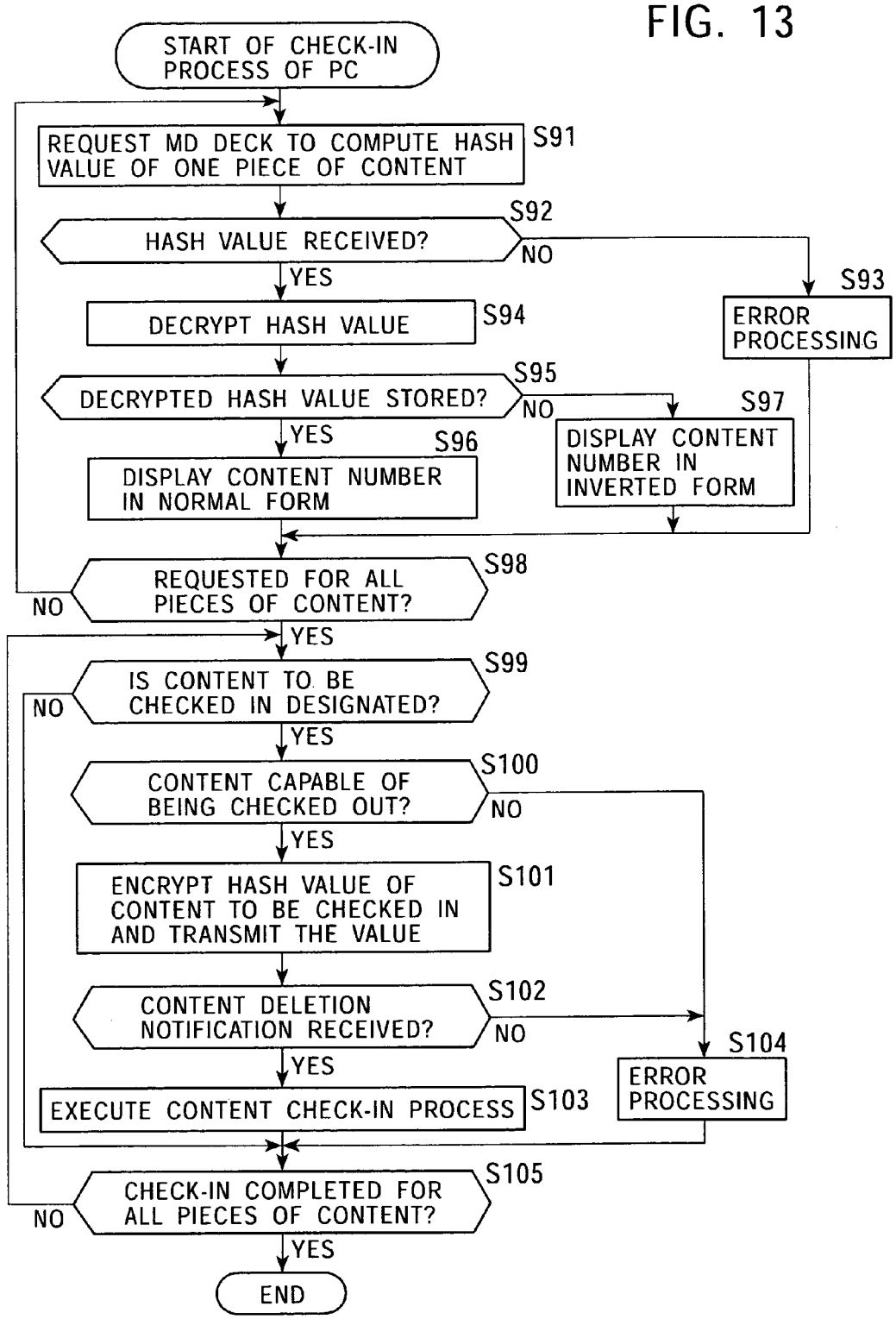
FIG. 13 is a flowchart illustrating another check-in process of a personal computer.

FIG. 13 illustrates the check-in process of the personal computer 1.

In step S91, the CPU 51 requests the MD deck 200 to compute a hash value of content in which order number (display number) is 1. As described later with reference to the flowchart in FIG. 14, in response to the request, the MD deck 200 computes the hash value of the designated content and transmits the value in an encrypted form (step S124 in FIG. 14). Accordingly, the CPU 51 determines whether or not it has received the hash value. When it has received, it proceeds to step S94, and decrypts the hash value (deciphers a code).

In step S95, the CPU 51 determines whether or not the hash value decrypted in the process of step S94 is stored as content ID in the usage condition file 67M in the HDD 67. When the decrypted hash value is stored in the usage condition file 67M, the CPU 51 proceeds to step S96, and controls the LCD 26 to display the order number of the content in a normal state (in normal form).

Conversely, when it is determined that the decrypted hash value is not stored as the content ID, the CPU 51 proceeds to step S97 and displays, on the LCD 26, the order number corresponding to the content in an inverted form.

It may not be said that content whose hash value is not stored as the content ID is managed by the personal computer 1 about check-in and check-out. Conversely, when the hash value is stored, it may be said that the corresponding content is managed by the personal computer 1 about check-in and check-out. Depending on the order number displayed in the normal form or the inverted form, the user can determine whether or not the content is managed by the personal computer 1, which is presently linked.

In step S92, when it is determined that the hash value has not been received from the MD deck 200, the CPU 51 proceeds to step S93 and executes error processing.

After the process of step S96, S97, or step S93, the CPU 51 determines in step S98 whether it has requested computation of hash values of all the pieces of the content. When content for which no request is made remains, the CPU 51 returns to step S91 and repeatedly executes the subsequent processes.

When it is determined in step S98 that the above processes are executed for all the pieces of content, the order numbers of all the pieces of content recorded in the MD 209 loaded into the MD deck 200 are displayed on the LCD 26. By viewing the display, the user can designate content to be check-in.

Accordingly, in step S99, the CPU 51 determines whether or not content to be check-in is designated by the user. When the content is not designated, the CPU 51 proceeds to step S105, and determines whether or not check-in of all the pieces of content is completed. When check-in of all the pieces of content is not completed, the CPU 51 returns to step S99, and repeatedly executes the subsequent processes.

In step S99, when it is determined that the content to be illustration is designated by the user, the CPU 51 proceeds to step S100, and determines whether or not the designated content can be checked in. As described above, the order number of content managed by the personal computer 1 is displayed in the normal format, and the order number of content that is not managed is displayed in the inverted form. Accordingly, based on whether or not the designated order number is displayed in the normal format, it is determined whether or not the content can be displayed.

When the content that can be check-in is designated, the CPU 51 proceeds to step S101, and encrypts the hash value of the designated content as content ID, and transmits the hash value to the MD deck 200 (alternatively, instead of the hash value, the order number corresponding to the content may be encrypted and transmitted).

Figure 14:
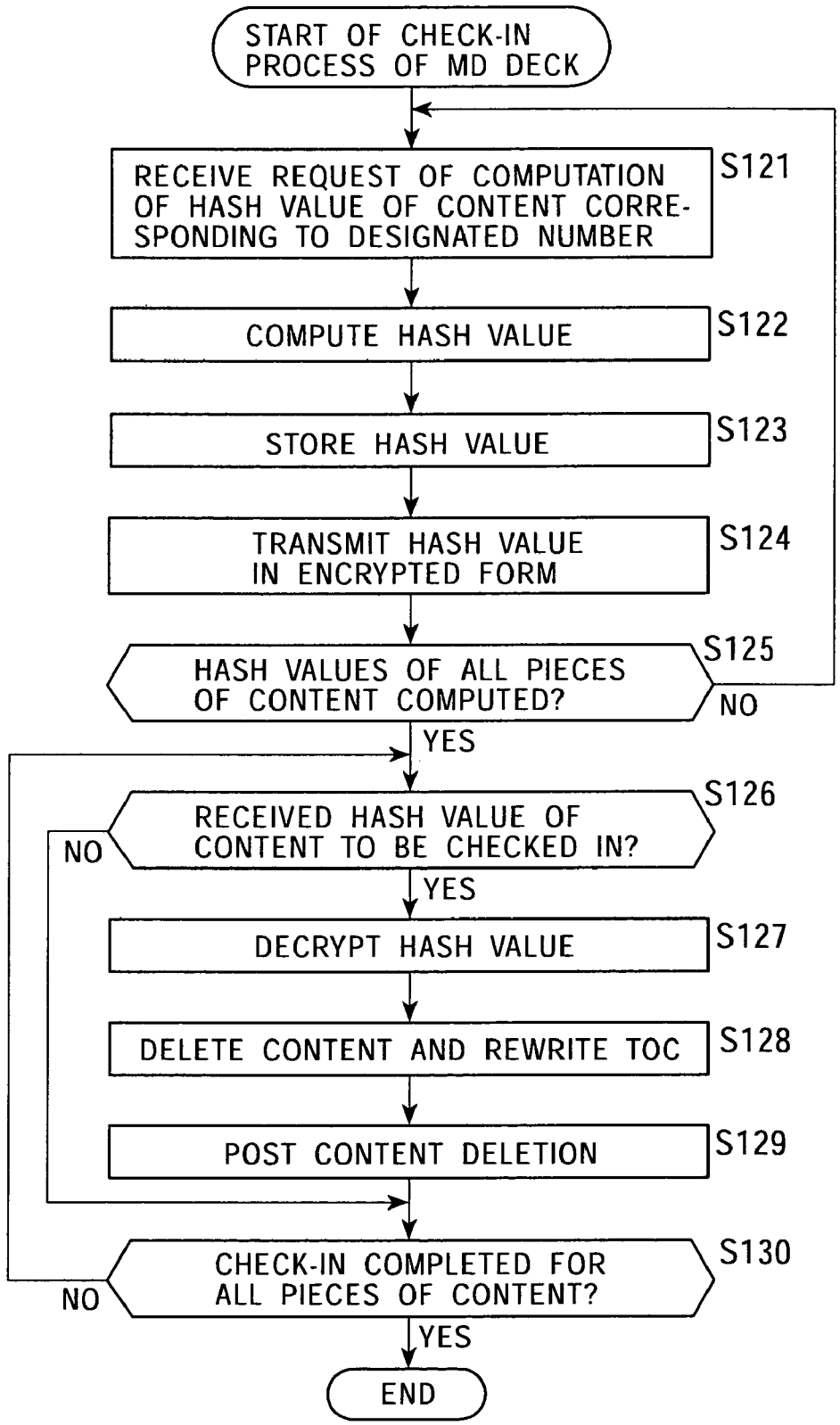
FIG. 14 is a flowchart illustrating another check-in process of an MD deck.

As described later with reference to FIG. 14, when receiving the hash value of the content to be check-in, the MD deck 200 deletes the content corresponding to the hash value, and transmits a deletion notification (step S129).

Accordingly, in step S102, the CPU 51 determines whether or not it has received the content deletion notification from the MD deck 200. When it has received, it proceeds to step S103, and executes a check-in process on the content. Specifically, the number of times check-out can be performed is incremented by 1.

When it is determined in step S100 that the designated content cannot be check-in, or when it is determined in step S102 that the content deletion notification has not been received, the CPU 51 proceeds to step S104, and executes error processing. After the process of step S103 or step S104, the CPU 51 proceeds to step S105, and determines whether or not check-in of all the pieces of content is completed. When content on which check-in is not completed remains, the CPU 51 returns to step S99, and repeatedly executes the subsequent processes. When it is determined that the check-in of all the pieces of content is completed, the process is terminated.

Next, a check-in process of the MD deck 200 is described with reference to the flowchart in FIG. 14.

When receiving, in step S121, the request to compute the hash value of the content corresponding to the designated order number, in step S122, the control unit 207 controls, based on the request, the arithmetical unit 206 to compute the hash value of the content corresponding to the designated order number.

In step S123, the control unit 207 stores in an internal memory the hash value computed by the arithmetical unit 206 in the process of step S122. This memory is used, in the process of step S128 described later; to identify content to be deleted.

Next, in step S124, the control unit 207 supplies the encryption/decryption unit 202 with the hash value computed in the process of step S122, and controls it to encrypt the value. The encrypted hash value is controlled to be transmitted from the input/output unit 201 to the personal computer 1.

In step S125, the control unit 207 determines whether or not the hash values of all the pieces of content have been computed. When content for which computation has not been performed remains, the process returns to step S121 and repeatedly executes the subsequent processes.

When it is determined that the hash values of all the pieces of content have been computed by the above processes, a state in which a specific check-in process can be executed is activated. Thus, the process proceeds to step S126.

In step S126, the control unit 206 determines whether or not the hash value of the content to be check-in has been received. In other words, when the content to be check-in is designated by the user, the personal computer 1 encrypts the hash value of the content to be checked in, and transmits the value (step S101).

Accordingly, in step S126, when the control unit 207 determines that the hash value has received as the content ID of the content to be checked in, it proceeds to step S127, and controls the encryption/decryption unit 202 to decrypt the received, encrypted hash value. In step S128, the control unit 207 controls the recording/playback unit 205 to delete the content corresponding to the hash value obtained by decryption. Also, the control unit 207 rewrites the TOC data of the MD 209 in association with the deletion.

In step S129, the control unit 207 controls the encryption/decryption unit 202 to encrypt the notification representing the deletion of the content, and transmits the notification to the personal computer 1.

As described above, based on the notification, the personal computer 1 executes the check-in process on the deleted content (step S103).

Next, proceeding to step S130, it is determined whether or not check-in of all the pieces of content is completed. When content whose check-in is not completed remains, the process returns to step S126, and repeatedly executes the subsequent processes. When it is determined that the check-in of all the pieces of content is completed, the process is terminated.

All communications between the personal computer 1 and MD deck 200 through the USB cable 10 are encrypted. This prevents illegal copyright management.

Although the above sequential processes can be executed by hardware, they can be executed by software. When software is used to execute the sequential processes, by installing a program forming the software into a computer built into dedicated hardware, or installing various programs, the installation is performed from a program storage medium to, for example, a multipurpose personal computer, or the like, which can execute various functions.

Figure 6:
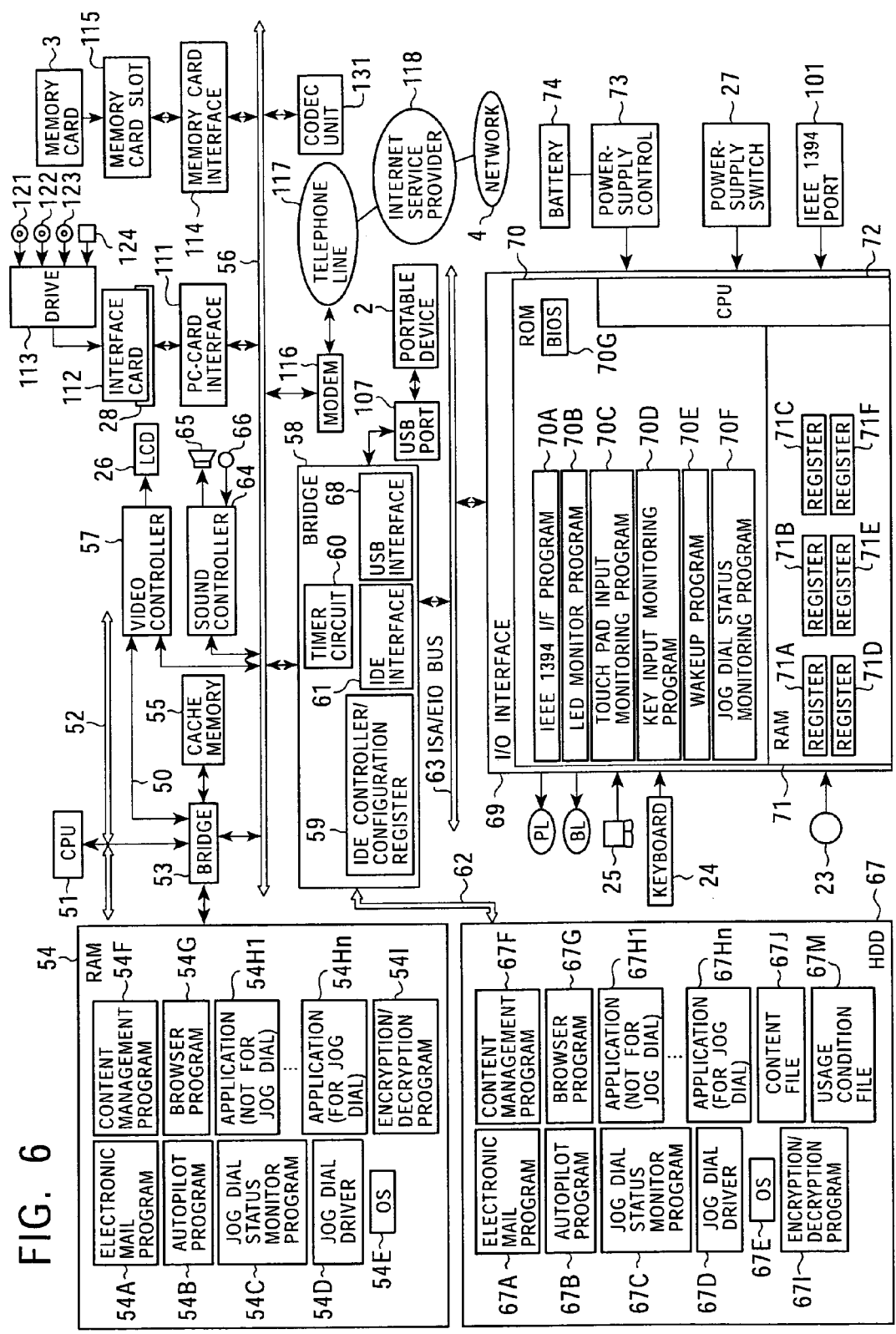
FIG. 6 is a block diagram showing an example of the internal structure of the personal computer 1 shown in FIG. 1.

The program storage medium for storing a program that is installed into a computer and is controlled to be executable by the computer is formed by, as shown in FIG. 6, the magnetic disk 121 (including a floppy disk), the optical disk 122 (including a CD-ROM (Compact Disc-Read Only Memory) and a DVD (Digital Versatile Disc), the magnetooptical disk 123 (including MD (Mini-Disc)), package media composed of the semiconductor memory 124, etc., the ROM 70 or the HDD 67, which temporarily or permanently stores the program, or the like. The storage of the program to the program storage medium is performed by using wired or wireless communication media such as a local area network, the Internet, and a digital satellite, through interfaces such as a router and a modem if necessary.

In the present Specification, the steps constituting the program stored in the program storage medium include, not only sequential processes performed in accordance with the described order, but also processes which are not always sequentially performed and which are executed separately or in parallel.

In addition, the program executing the above sequential processes may be installed into the computer by using wired or wireless communication media such as a local area network, the Internet, and a digital satellite, through interfaces such as a router and a modem if necessary.

In the present Specification, the system represents the entirety of an apparatus constituted by a plurality of devices.

INDUSTRIAL APPLICABILITY

According to the first present invention, based on a computation value computed by another arithmetical processing unit, content is managed. Thus, the copyright of the content can be managed, even if identification information for identifying the content is not found.

According to the second present invention, a computation value computed based on content is transmitted to another information processing apparatus, and based on the computed value, the content is managed based on management information transmitted from the other information apparatus. Thus, the content can be used while its copyright is being protected, even if identification information for identifying the content is not found.

According to the third present invention, content is transmitted in an encrypted form from a first information processing apparatus to a second information processing apparatus, and the code is decrypted and recorded on a recording medium by the second information processing apparatus, and a computation value computed based on the content is transmitted to the first information processing apparatus. The first information processing apparatus generates and transmits management information based on the computed value to the second information processing apparatus, and performs management based on the computed value of the content. Therefore, an information processing system that can manage the copyright of content, even if identification information for identifying the content is not found.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus operable to perform content management, the apparatus comprising:
    acquiring means that acquires content that is to be transferred to another information processing apparatus;
    encryption means that encrypts the acquired content;
    transmitting means that transmits the encrypted content to the another information processing apparatus;
    receiving means that receives, from the another information processing apparatus, a computation value that is computed by the another information processing apparatus based on the transmitted encrypted content;
    storage means that stores the received computation value; and
    management means that, in response to said receiving means receiving and said storage means storing the computation value, causes said transmitting means to transmit usage information to the another information processing apparatus that permits use of the content by the another information processing apparatus;
    wherein said management means, based on the usage information, subsequently requests the another information processing apparatus to compute another value,
    said receiving means receives the another value from the another information processing apparatus,
    said management means compares the received value to the computation value stored in said storage means, and in response to the received value corresponding to the stored computation value, causes said transmitting means to transmit a request to the another information processing apparatus to delete the content.

2. The information processing apparatus according to claim 1, wherein the usage information is information about temporally using the content at the another information processing apparatus.

3. The information processing apparatus according to claim 1, wherein in response to the received value corresponding to the computation value stored in said storage means, said management means causes said transmitting means to transmit, to the other information processing apparatus, further usage information that prohibits further use of the content by the another information processing apparatus.

4. The information processing apparatus according to claim 3, wherein the further usage information is information about temporally restricting the further use of the content at the another information processing apparatus.

5. The information processing apparatus according to claim 1, further comprising encoding means that encodes the content acquired by said acquiring means into a different format, and wherein said encryption means encrypts the encoded content.

6. The information processing apparatus according to claim 1, wherein the computation value is a hash value computed based on data from a portion of the content.

7. An information processing method for an information processing apparatus operable to perform content management, the method comprising:
    acquiring content that is to be transferred to another information processing apparatus;
    encrypting the acquired content;
    transmitting the encrypted content to the another information processing apparatus;
    receiving, from the another information processing apparatus, a computation value that is computed by the another information processing apparatus based on the transmitted encrypted content;
    storing the received computation value;
    transmitting, in response to said receiving and storing of the computation value, usage information to the another information processing apparatus that permits use of the content by the another information processing apparatus;
    subsequently requesting, based on the usage information, the another information processing apparatus to compute another value;
    receiving the another value from the another information processing apparatus;
    comparing the received value to the stored computation value; and
    transmitting, in response to the received value corresponding to the stored computation value, a request to the another information processing apparatus to delete the content.

8. A computer-readable storage medium encoded with a computer program for carrying out an information processing method in an information processing apparatus operable to perform content management, the method comprising:
    acquiring content that is to be transferred to another information processing apparatus;
    encrypting the acquired content;
    transmitting the encrypted content to the another information processing apparatus;
    receiving, from the another information processing apparatus, a computation value that is computed by the another information processing apparatus based on the transmitted encrypted content;

storing the received computation value;

transmitting, in response to said receiving and storing of the computation value, usage information to the another information processing apparatus that permits use of the content by the another information processing apparatus;

subsequently requesting, based on the usage information, the another information processing apparatus to compute another value;

receiving the another value from the another information processing apparatus;

comparing the received value to the stored computation value; and transmitting, in response to the received value corresponding to the stored computation value, a request to the another information processing apparatus to delete the content.

9. A processor encoded with a computer program for carrying out an information processing method in an information processing apparatus operable to perform content management, the method comprising:

acquiring content that is to be transferred to another information processing apparatus;

encrypting the acquired content;

transmitting the encrypted content to the another information processing apparatus;

receiving, from the another information processing apparatus, a computation value that is computed by the another information processing apparatus based on the transmitted encrypted content;

storing the received computation value;

transmitting, in response to said receiving and storing of the computation value, usage information to the another information processing apparatus that permits use of the content by the another information processing apparatus;

subsequently requesting, based on the usage information, the another information processing apparatus to compute another value;

receiving the another value from the another information processing apparatus;

comparing the received value to the stored computation value; and transmitting, in response to the received value corresponding to the stored computation value, a request to the another information processing apparatus to delete the content.

10. An information processing apparatus using content information, the apparatus comprising:

acquiring means that acquires content transferred from another information processing apparatus;

computing means that performs a predetermined computation based on the acquired content to generate a computation value;

transmitting means that transmits, to the another information processing apparatus, the generated computation value;

receiving means that receives, from the another information processing apparatus, management information for managing the content, the management information being generated by the another information processing apparatus based on the transmitted computation value; and management means that manages the content based on the received management information;

wherein said receiving means subsequently receives, from the another information processing apparatus, a request to compute another value, and in response to said receiving means receiving the request, said transmitting transmits the another value to the another information processing apparatus, said receiving means receives a request from the another information processing apparatus to delete the content, said management means deletes the content, and said transmitting transmits, to the another information processing apparatus, notification that the content was deleted.

11. The information processing apparatus according to claim 10, wherein the computation value generated by said computing means is a hash value that is based on data from a portion of the content.

12. The information processing apparatus according to claim 10, wherein the content acquired by said acquiring means is encrypted content; said information processing apparatus further comprises decryption means that decrypts the encrypted content, and recording means that records the decrypted content on a recording medium; and said management means records, on said recording medium, information for causing the content to be usable based on the received management information.

13. The information processing apparatus according to claim 12, wherein the management information is information about temporally restricting use of the content that is received from the another information processing apparatus.

14. The information processing apparatus according to claim 12, wherein said management means records table of content information concerning the content recorded on said recording medium.

15. The information processing apparatus according to claim 12, further comprising encoding means that encodes the decrypted content into a different format, and wherein said recording means records the encoded content and said computing means performs a computation for the encoded content.

16. An information processing method for an information processing apparatus, the method comprising:

acquiring content transferred from another information processing apparatus;

performing a predetermined computation based on the acquired content to generate a computation value;

transmitting, to the another information processing apparatus, the computation value;

receiving, from the another information processing apparatus, management information for managing the content that is generated by the another information processing apparatus based on the transmitted computation value;

managing the content based on the received management information;

subsequently receiving, from the another information processing apparatus, a request to compute another value;

transmitting the another value to the another information processing apparatus;

receiving a request from the another information processing apparatus to delete the content;

deleting the content; and transmitting, to the another information processing apparatus, notification that the content was deleted.

17. A computer-readable storage medium encoded with a computer program for carrying out an information processing method in an information processing apparatus using content information, the method comprising:

acquiring content transferred from another information processing apparatus;

performing a predetermined computation based on the acquired content to generate a computation value;

transmitting, to the another information processing apparatus, the computation value;

receiving, from the another information processing apparatus, management information for managing the content that is generated by the another information processing apparatus based on the transmitted computation value;

managing the content based on the received management information;

subsequently receiving, from the another information processing apparatus, a request to compute another value;

transmitting the generated another value to the another information processing apparatus;

receiving a request from the another information processing apparatus to delete the content;

deleting the content; and transmitting, to the another information processing apparatus, notification that the content was deleted.

18. A processor encoded with a computer program for carrying out an information processing method in an information processing apparatus, the method comprising:

acquiring content transferred from another information processing apparatus;

performing a predetermined computation based on the acquired content to generate a computation value;

transmitting, to the another information processing apparatus, the computation value;

receiving, from the another information processing apparatus, management information for managing the content that is generated by the another information processing apparatus based on the transmitted computation value;

managing the content based on the received management information;

subsequently receiving, from the another information processing apparatus, a request to compute another value;

transmitting the generated another value to the another information processing apparatus;

receiving a request from the another information processing apparatus to delete the content;

deleting the content; and transmitting, to the another information processing apparatus, notification that the content was deleted.

19. An information processing system, comprising:

a first information processing apparatus; and a second information processing apparatus;

said first information processing apparatus including:

first acquiring means that acquires content that is to be transferred to said second information processing apparatus, encryption means that encrypts the acquired content, first transmitting means that transmits the encrypted content to said second information processing apparatus, first receiving means that receives, from said second information processing apparatus, a computation value computed by the second information processing apparatus based on the transmitted encrypted content, first storage means that stores the received computation value, and first management means that in response to said first receiving means receiving and said first storage means storing the computation value, causes said first transmitting means to transmit the management information to said second information processing apparatus that permits use of the content by said second information processing apparatus, wherein said first management means, based on the usage information, subsequently requests said second information processing apparatus to compute another value, said first receiving means receives the value from said second information processing apparatus, said first management means compares the received value to the computation value stored in said storage means, and in response to the received value corresponding to the stored computation value, causes said first transmitting means to transmit a request to said second information processing apparatus to delete the content; and said second information processing apparatus including:

second acquiring means that acquires the transmitted content from said first information processing apparatus, computing means that performs a predetermined computation based on the acquired content to generate the computation value, second transmitting means that transmits, to said first information processing apparatus, the generated computation value, second receiving means that receives the management information transmitted by said first information processing apparatus, second management means that manages the content based on the received management information, wherein said second receiving means subsequently receives, from said first information processing apparatus, a request to compute another value, said second transmitting transmits the generated another value to said first information processing apparatus, said second receiving means receives a request from said first information processing apparatus to delete the content, said second management means deletes the content, and said second transmitting transmits, to said first information processing apparatus, notification that the content was deleted.

* * * * *